US012737252B2

(12) United States Patent
Nigudkar et al.

(10) Patent No.: US 12,737,252 B2
(45) Date of Patent: Sep. 15, 2026

(54) INTUITIVE DEFECT PREVENTION WITH SWARM LEARNING INTELLIGENCE OVER BLOCKCHAIN NETWORK

(71) Applicant: Bank of America Corporation, Charlotte, NC (US)

(72) Inventors: Avinash Nigudkar, Mumbai (IN); Lingaraj Gopalakrishnan, Tamilnadu (IN); Anmol Puri, Haryana (IN); Vijay Kumar Battiprolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 190 days.

(21) Appl. No.: 18/527,991

(22) Filed: Dec. 4, 2023

(65) Prior Publication Data

US 2025/0181444 A1 Jun. 5, 2025

(51) Int. Cl.
*G06F 11/07* (2006.01)
*G06N 3/006* (2023.01)

(52) U.S. Cl.
CPC ...... *G06F 11/0793* (2013.01); *G06F 11/0709* (2013.01); *G06N 3/006* (2013.01)

(58) Field of Classification Search
CPC .................................................. G06F 11/0793
See application file for complete search history.

(56) References Cited

U.S. PATENT DOCUMENTS 8,010,475 B2 8/2011 Zhao et al.
10,963,786 B1 3/2021 Taylor et al.
11,144,025 B2 10/2021 Cella et al.
11,546,361 B2 1/2023 A. K.
11,907,046 B2 2/2024 Lai
2018/0165416 A1 6/2018 Saxena et al.
2018/0165554 A1 6/2018 Zhang et al.
2018/0165585 A1 6/2018 Saxena et al.
2018/0165588 A1 6/2018 Saxena et al.
2019/0358515 A1 11/2019 Tran et al.
2020/0220887 A1 7/2020 A.K.
2021/0295637 A1 9/2021 Ovalle
2022/0101326 A1* 3/2022 Kim .................. G06Q 20/4016
2022/0327042 A1* 10/2022 Sohns ................. G06F 11/3698

FOREIGN PATENT DOCUMENTS

CN 110658373 A * 1/2020 ............ G01R 11/24
CN 115794658 A * 3/2023

(Continued)

OTHER PUBLICATIONS

Wikipedia: "Swarm Intelligence"; <https://en.wikipedia.org/Wiki/Swarm_intelligence>, Oct. 6, 2023.

(Continued)

*Primary Examiner* — Jae U Jeon

(74) *Attorney, Agent, or Firm* — Banner & Witcoff, Ltd.

(57) ABSTRACT

Aspects of the disclosure relate to s computing system that is configured to use heuristic and/or metaheuristic algorithms based on swarm learning (SL) intelligence frameworks and combine SL with blockchain and edge computing frameworks to provide a technologically efficient, responsive, and/or adaptable solution to detecting and preventing defects in software applications.

17 Claims, 8 Drawing Sheets

(56) References Cited

FOREIGN PATENT DOCUMENTS

| | | | | |
|---|---|---|---|---|
| JP | 2018077259 | A | * | 5/2018 |
| WO | 2020206695 | A1 | | 10/2020 |

OTHER PUBLICATIONS

Wikipedia: "Metaheuristic"; https://en.wikipedia.org/Wiki/Metaheuristic, Oct. 6, 2023.
Wikipedia: "Swarm behavior"; https://en.wikipedia.org/Wiki/Swarm_behaviour, Oct. 6, 2023.
H Setiawan et al, 2019 IOP Conf. Ser.: Mater. Sci. Eng. 662 022085.
S Lakshmi Narayanan et al., "Particle swarm optimization based artificial neural network (PSO-ANN) model for effective k-barrier count intrusion detection system in WSN", 2023.
A Tam, "A Gentle Introduction to Particle Swarm Optimization", 2021.
Zhu, Chaoyang, et al. "Blockchain-enabled federated learning for UAV edge computing network: Issues and solutions." Ieee Access 10 (2022): pp. 56591-56610. (Year: 2022).
Tange, Koen, et al. "A systematic survey of industrial Internet of Things security: Requirements and fog computing opportunities." IEEE Communications Surveys & Tutorials 22.4 (2020): pp. 2489-2520. (Year: 2020).
Han, Jialiang, Yun Ma, and Yudong Han. "Demystifying swarm learning: A new paradigm of blockchain-based decentralized federated learning." arXiv preprint arXiv:2201.05286 (2022). pp. 1-20. (Year: 2022).
Fan, Di, Yifan Wu, and Xiaoxiao Li. "On the fairness of swarm learning in skin lesion classification." MICCAI Workshop on Distributed and Collaborative Leaming. Cham: Springer International Publishing, 2021. pp. 1-10. (Year: 2021).
Koroniotis, Nickolaos, and Naur Moustafa. "Enhancing network forensics with particle swarm and deep learning: The particle deep framework." arXiv preprint arXiv:2005.00722 (2020). pp. 1-20. (Year: 2020).
Al-Araji, Zaid Jasim, et al. "Fuzzy theory in fog computing: review, taxonomy, and open issues." IEEE Access 10 (2022): pp. 26931-126956. (Year: 2022).

* cited by examiner

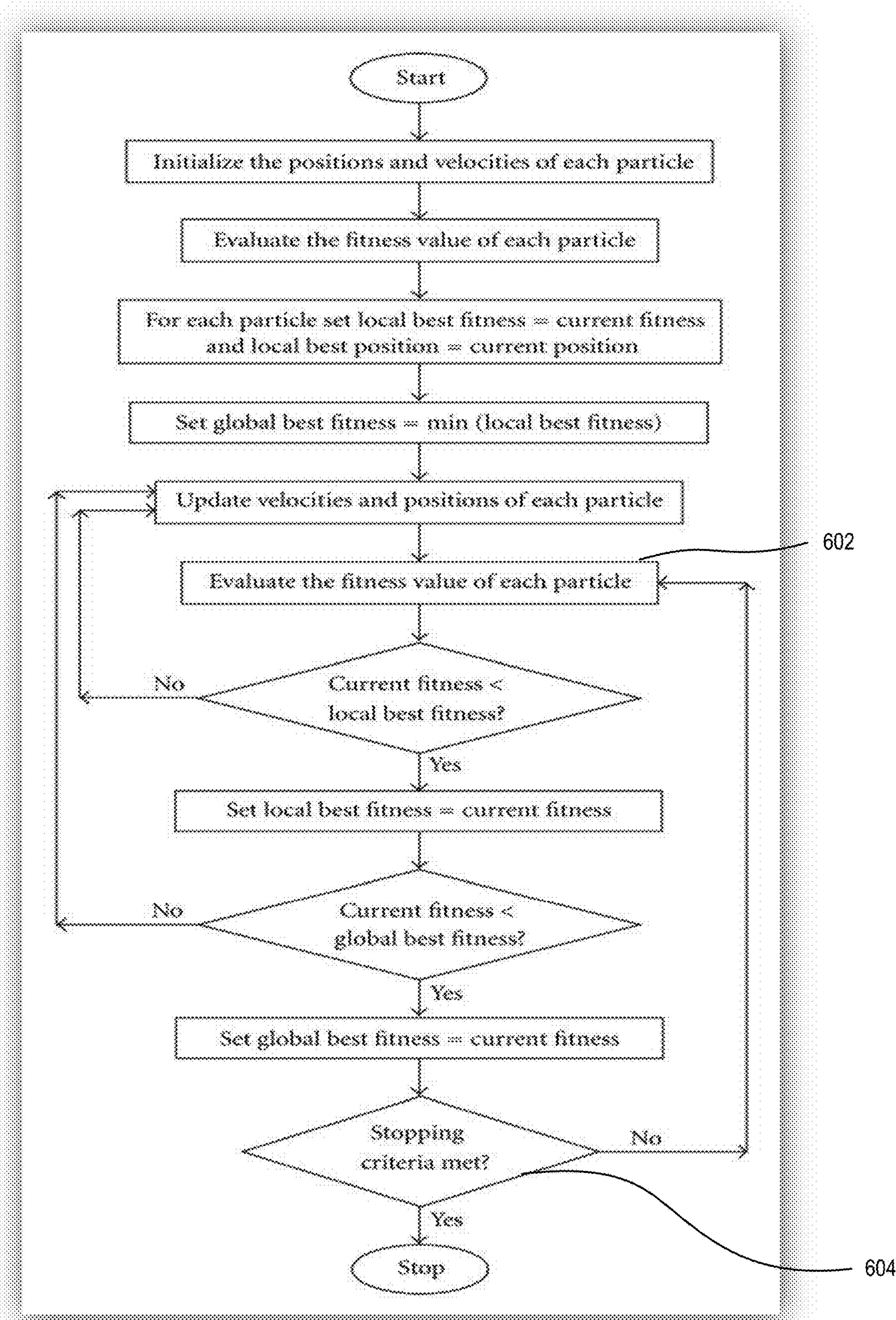
Start
Initialize the positions and velocities of each particle
Evaluate the fitness value of each particle
For each particle set local best fitness = current fitness and local best position = current position
Set global best fitness = min (local best fitness)
Update velocities and positions of each particle
602
Evaluate the fitness value of each particle
Current fitness < local best fitness?
No
Yes
Set local best fitness = current fitness
Current fitness < global best fitness?
No
Yes
Set global best fitness = current fitness
Stopping criteria met?
No
Yes
Stop
604
600

INTUITIVE DEFECT PREVENTION WITH SWARM LEARNING INTELLIGENCE OVER BLOCKCHAIN NETWORK

BACKGROUND

Defect management lifecycle via traditional approaches often requires a defect tracking tool which is used by agile teams to track defects where a QA (quality assurance) team might log the defects so that a release team might dispose of them. These defects may be fixed/debugged by a development team and then re-tested by the QA team. In a traditional agile release cycle, there may be multiple iterations of defect logging, testing of failures, and retesting until a software is ready for release to production.

Part of the QA testing activities may include release and regression tests. And there are many defects that are false positives (e.g., environmental, test data, test script, requirement gap) and do not require code fixes from the development team. However, these false positives may have to go through the entire defect lifecycle where the entire agile team has ownership of these defects until the root cause of these are ascertained (e.g., environmental, test data, test script, requirement gap) and then categorized as false positives. Such defects are overhead for the development team as the troubleshooting time spent on these could actually have been utilized for fixing legitimate code fixes.

In an increasingly competitive marketplace, system complexity continues to grow, but time-to-market and lifecycle are reducing. Meanwhile, the over-the-wall reactive model of traditional defect management systems leads to long debug times and increased operational costs as the turnaround time (TAT) on defect resolution is significantly higher due to lack of controls to limit and dispose of the false positives earlier in a release cycle. These and other shortcomings in the prior art defect management lifecycle are ripe for improvement.

In addition, US published patent application US20200241861A1, titled, "Software component defect prediction using classification models that generate hierarchical component classifications," uses a feature vector and a machine-learning model configured to predict classifications and sub-classifications of a textual description. It integrates the classifications and the sub-classifications into a final classification of the textual description that indicates a software component responsible for causing the software defect.

The feature vector comprises various attributes such as lines of code, cyclomatic complexity, and number of dependencies that are relevant to the software component under consideration. These attributes are normalized and fed into the machine learning model for training and prediction. The machine learning model is trained on the feature vectors to predict classifications and sub-classifications of textual descriptions. These classifications may indicate the severity, type, and potential causes of the software defect. The model employs algorithms such as decision trees, random forests, or neural networks for prediction.

Furthermore, published Chinese patent CN114968773A, titled, "Software defect prediction method based on gene expression programming algorithm," uses a gene expression programming algorithm based on field variation to optimally design the construction problem of a software defect prediction model. The convergence speed and precision of the standard gene expression programming algorithm are improved, so that the precision of software defect prediction is improved.

BRIEF SUMMARY

A first claim set is directed to a novel, decentralized particle swarm model that is, inter alia, configured to analyze application failure logs and generate recommendations to remedy critical software issues. In an illustrative framework, swarm learning (SL) intelligence may create an automated workflow for critical issues. Meanwhile, the system may create a predictive model that feeds into a defect prevention learning data store. In some examples, the aforementioned data store may store embeddings of the defect prevention learning for ease of use with one or more machine learning models.

A second claim set is directed to using a particle swarm model and/or other metaheuristic algorithm (e.g., genetic algorithm (GA), ant colony optimization (ACO), or other techniques) to categorize software defects and generate a defect prevention framework that may be used to assist developers and other personnel.

A third claim set is directed to leveraging the defect prevention framework and/or a machine learning model to generate augmented reality and/or virtual reality (AR/VR) simulations relating to the software development cycle (SDC) that may be used to train personnel (e.g., developers) and/or assist personnel remotely.

At least one novel aspect of the several embodiments disclosed herein includes VR/AR experimental simulations developed to analyze cognitive responses to specific defect categories. For example, expert solutions may be converted into remote assistance programs for users, VR/AR preventive maintenance against baseline conditions, and VR/AR corrective maintenance based on blockchain created solution dataset(s). Moreover, in some examples, expert solutions may be converted into remote assistance programs for DEVs/QAs and integrated into CICD to automatically fix common issues on their own.

At least one non-obvious aspect of the several embodiments disclosed herein includes trying to reduce noise and prevent overall defects throughout the software development lifecycle (SDL), in addition to fixing defects, thereby reducing expenses and improving product quality aligning to the agile testing manifesto.

Another non-obvious aspect of the several embodiments disclosed herein includes swarm learning (SL) that proactively controls the forcing functions that potentially lead to failure. In some examples proactive detection may be desired because it reveals a forcing condition, automates root-cause analysis, quick resolution and minimal impact on delivery.

Yet another non-obvious aspect of the several embodiments disclosed herein includes swarm learning analysis that eliminates noise that, notably, did not contribute to the failure and leaves the delivery team with a manageable set of enabling factors for failure.

Also, another non-obvious aspect of the several embodiments disclosed herein includes the one or more principles of SL without the need for a central repository and results in a potential for cost saving by offloading processing to smaller edge devices/computing device and by using less bandwidth.

Yet another non-obvious aspect of the several embodiments disclosed herein includes using a defect prevention learning dataset generated from a SL intelligence framework to create one or more VR/AR systems tailored for the development and/or QA teams. The VR/AR system may be integrated with a CICD pipeline such that the software is released to production with fewer defects.

BRIEF DESCRIPTION OF FIGURES

The present disclosure is illustrated by way of example and not limited in the accompanying figures in which like reference numerals indicate similar elements and in which:

FIG. 6 depicts a flowchart of an illustrative swarm intelligence framework seeking an optimal solution in accordance with one or more aspects of the disclosure;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Disclosed herein is an electronic computing system with one or more processors and one or more memories that collectively are configured to use heuristic and/or metaheuristic algorithms based on swarm learning (SL) intelligence frameworks. The computing system combines SL with blockchain and edge computing frameworks to provide a technologically efficient, responsive, and/or adaptable solution to detecting and preventing defects in software applications.

Figure 1:
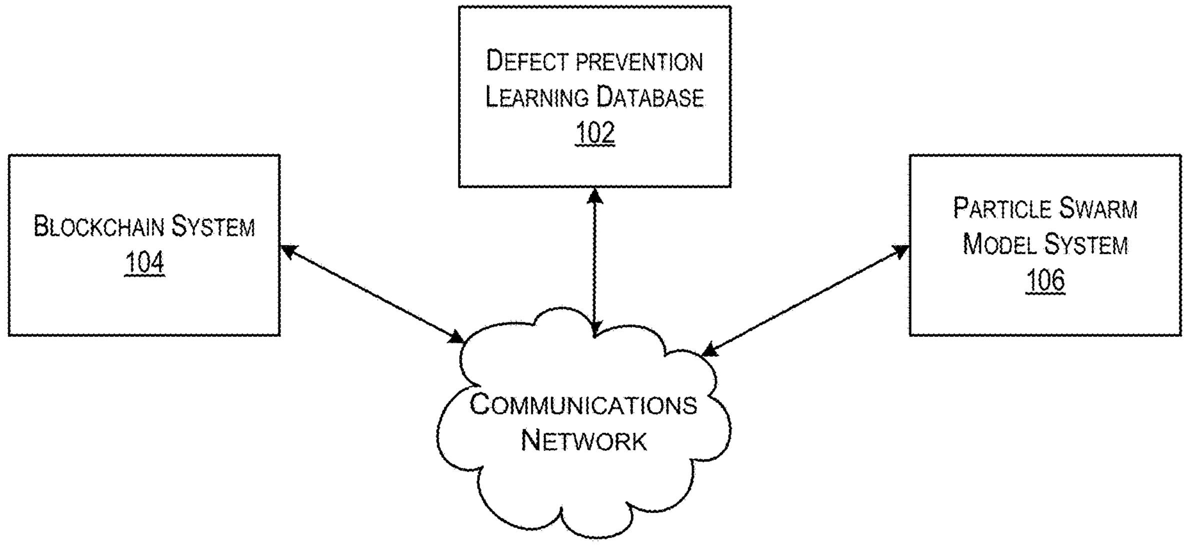
FIG. 1 depicts an illustrative computing environment for in accordance with one or more aspects of the disclosure.

Regarding FIG. 1, an illustrative computing environment 100 in which aspects of the disclosed features may operate is disclosed. A communications network (e.g., the Internet, a private network, or a public WAN network) may communicatively couple one or more of a blockchain system 104, a defect prevention learning database 102, and a particular swarm model system 106.

The blockchain system 104 may comprise a decentralized ledger that maintains a tamper proof record of, inter alia, software defects. The immutable (e.g., tamper-proof) blockchain records may store at least defect lifecycle events such as detection, classification, assignment, resolution, and so on. QA agents instantiated by the swarm system 106 may leverage the blockchain system 104 to log and retrieve defects and other information about the defects, such as the patterns and criticality, their priorities, and so on. The QA agent may also use the blockchain system 104 for smart contracts technology. The smart contracts may encode business logic for defect resolution workflows and be executed when particular conditions/criteria are met. For example, whatever resolution results from the workflow is programmatically embedded into these smart contracts, and if there is a high priority bug fix, the workflow may automatically direct it to a senior developer user that has experience fixing that category type of defect.

In addition, with the use of machine learning models and/or natural language processing, the QA agent of the swarm system 106 may be regularly/periodically/continuously trained to improve their defect detection capabilities and pattern identification by learning from historical data. As such, the QA agents may be represented, in some embodiments, as nodes on a blockchain as part of one framework. Meanwhile as part of a second framework, a machine learning (ML) model that is integrated into the system 100 may assist in training QA agents on historical data. Consequently, the QA agents may become better at understanding a code structure, defect pattern, category, and/or how to classify defects. As a result, the one or more ML models are trained on historical data to take advantage of one or more benefits described herein.

Furthermore, the integration between blockchain and swarm QA agents occurs, in some embodiments, through a middleware layer that handles routing of information between different components. For example, when the QA agent detects a defect, it may log the defect data onto the blockchain (or block). And using the peer-to-peer (P2P) communications network, the swarm system 106 may execute one or more workflows through smart contacts and also provide related data to train one or more ML models. As a result, advantageous synergies may be achieved. For example, QA agents and the blockchain may communicate through a middleware layer that handles routing of information between the components using their native protocols. For example, P2P messages may be translated to blockchain via smart contracts API calls. In some embodiments, data standardization may be used in addition or in lieu of some of the aforementioned. Such a mechanism may standardize the format of defect data generated by QA agents, such that it may be universally stored on a distributed blockchain ledges, thus improving interoperability. In some embodiments, the middleware layer may further comprise adapters configured to integrate business logic from smart contracts into the QA agents' P2P communications.

Figure 2:
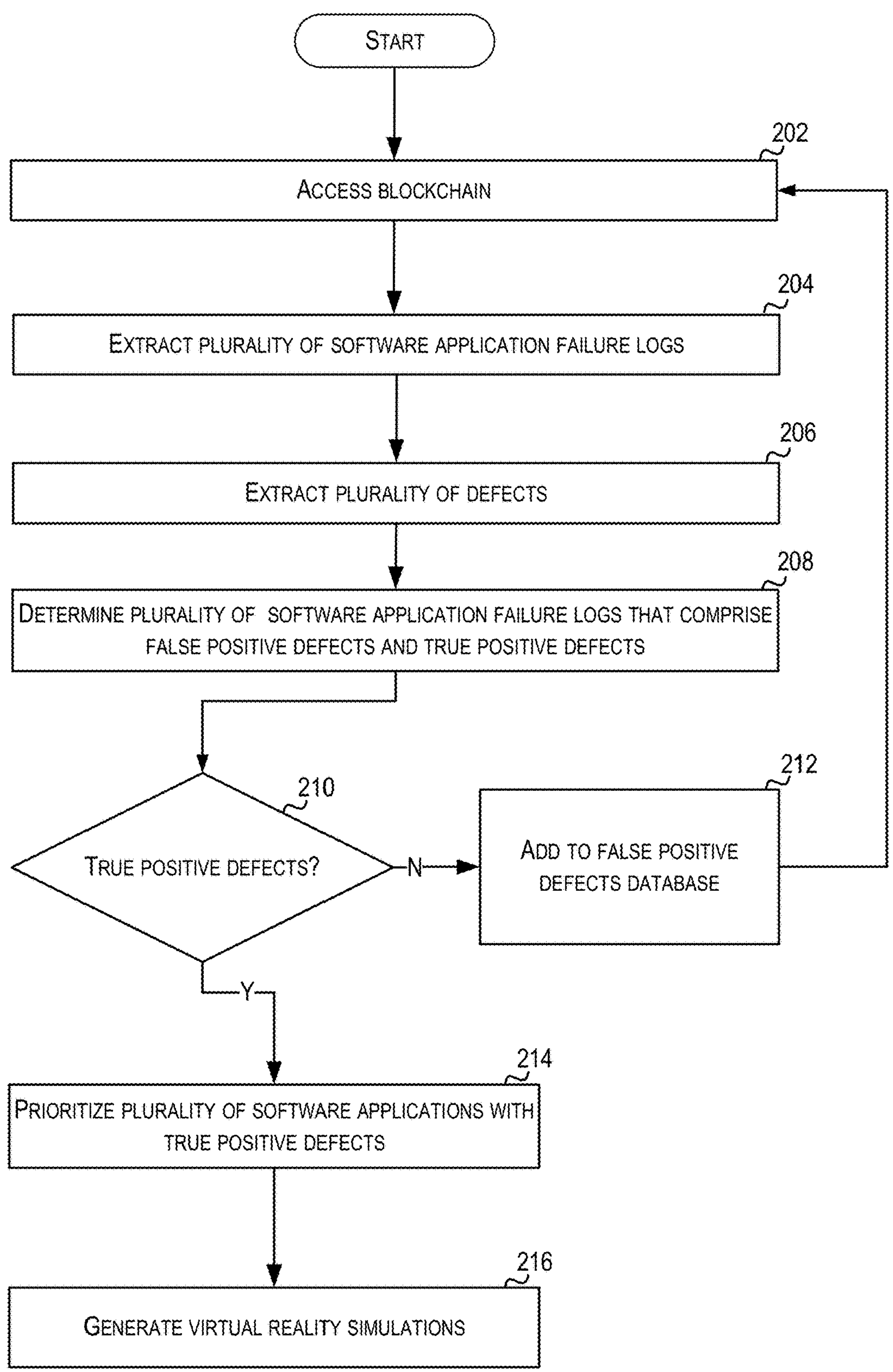
FIG. 2 depicts a flowchart in accordance with one or more aspects of the disclosure.

Regarding FIG. 2, a flowchart 200 is illustrated of simply one embodiment of various features disclosed herein. The swarm system 106 with QA agents may access 202 a blockchain to extract 204 one or more software application failure logs. The log files may be large or may be distributed across multiple machines or systems. The system 100 extracts 206 a plurality of defects from the logs and determine 208 a plurality of software application failure logs that comprise false positive defects and true positive defects. When 210 a true positive defect is determined, the system 100 prioritizes 214 that plurality of software applications with the true positive defects for debugging. And in some embodiments, the system 100 may generate 216 a virtual reality (or augmented reality) simulation to assist a developer user in efficiently debugging the particular defects. Meanwhile if the determined defect is not a true positive defect (e.g., because it is a false positive defect), then the system 100 may add 212 the false positive defect to a database 102 that includes a false positive defect database/ data store. And the method may proceed to again access 202 the blockchain system 104 to begin the process 200 again.

Figure 3:
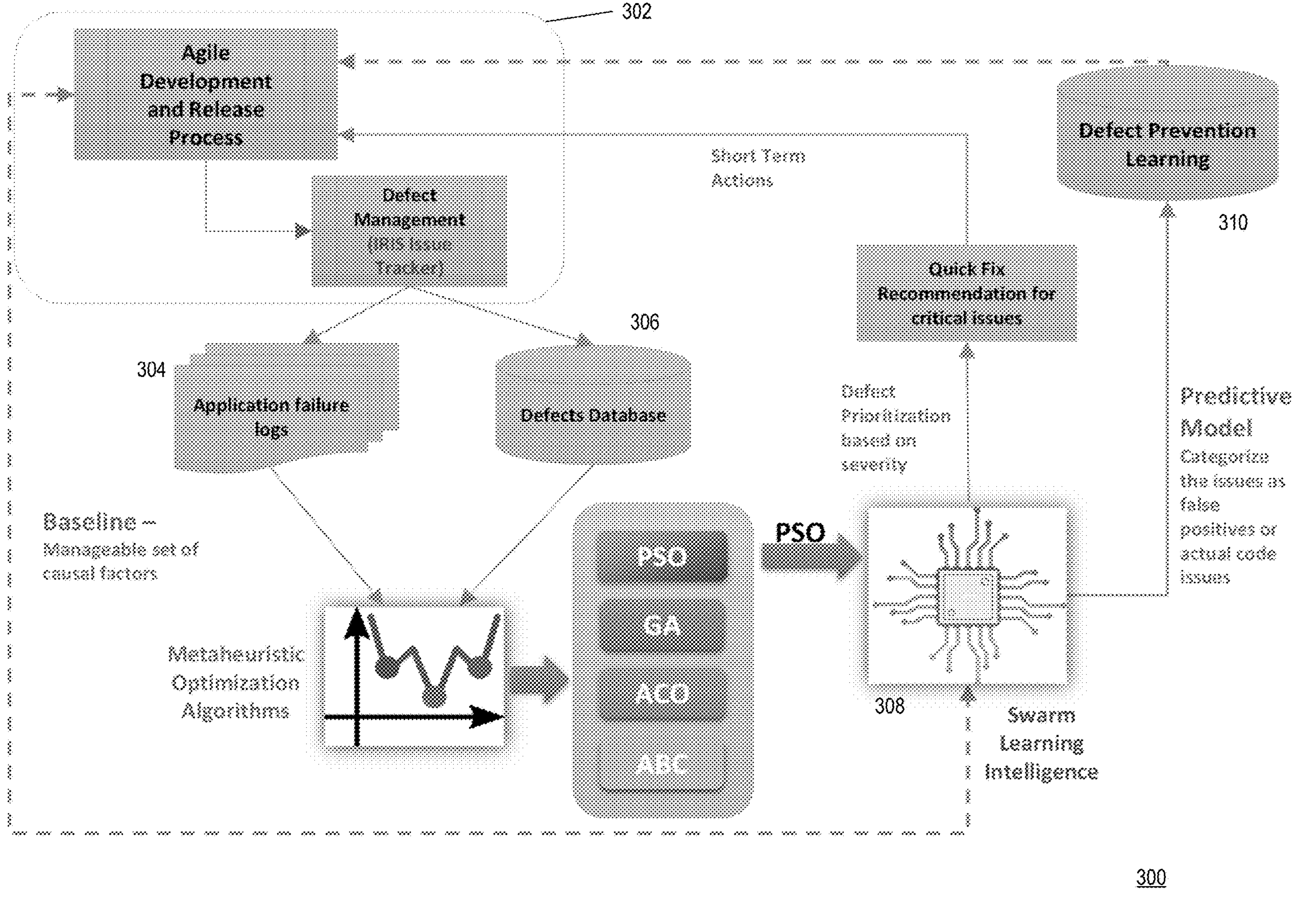
FIG. 3 depicts a defect prevention framework in accordance with one or more aspects of the disclosure.

Regarding FIG. 3, a defect prevention framework is illustrated that inter alia provides a guide to application developers with potential fixes to underlying code from previously learned similar issues. Swarm intelligence involves an objective function that describes a problem to be optimized/solved and decision variables/parameters that effect the problem. The optimization determines the best solution from all feasible solutions using measurements of possible, candidate solutions. For example, the objective function may be maximized or minimized to find those input decision variables that determine a fitness value of the objective function. At least one benefit of swarm intelligence over prior art methods (e.g., gradient-based methods) is their performance on non-differentiable functions as benchmarked against well-known benchmark functions.

In one example, the illustrative framework depicted in FIG. 3 shows that the system 300 is fetching the data from the defects and using it to lay a foundation for that data to be used to generate data pipelines. After the foundational steps of data collection and preparation shown in block 302, the resulting data may be split into two: one is an application failure logs 304, and other is a defects database 306. The system 300 optimizes the aforementioned split data using one or more metaheuristic optimization algorithms that pass their output to a swarm learning (SL) intelligence 308 module. The SL intelligence 308 module builds a predictive model that categorizes the issues as, in one example, false positives or actual code issues that go into a defect prevention learning data store/database 310. In other examples, the SL intelligence 308 module may build a predictive model that categorizes the issues based on other labels that would go into a software defect prevention learning database. Generally, by combining these data-driven insights, the system 300 framework not only assists in fixing defects, but it also may prevent them from emerging altogether.

As illustrated in FIG. 3, logs 304 and databases 306 feed into one or more metaheuristic optimization algorithms that may have genetic algorithm (GA) characteristics. For example, ant colony optimization (ACO) and/or artificial bee colony (ABC) are examples of metaheuristics that may be used in some examples. A gene expression programming algorithm based on field variation may be employed to optimally design the construction problem of a software defect prediction model. This algorithm improves the convergence speed and precision of the standard gene expression programming algorithm. Parameters such as crossover rate, mutation rate, and population size are adjusted based on the field variation to improve the prediction accuracy.

For example, FIG. 3 depicts a bespoke approach to metaheuristics optimization algorithms where swarm agents are used through a particle swarm optimization (PSO) algorithmic approach that leads the workflow to a swarm learning (SL) intelligence 308 module. More detailed examples of how the PSO operates are described herein, such as with respect to FIG. 5 below. In general, the PSO approach takes the application failure logs 304 and defect database 306, and assigns each particle information in the swarm algorithm and baseline, learning whatever critical defects there are. Quick fix defects are sent for short-term action. Quick fix may be those that are short-term actions and defects that are fixed weekly. Meanwhile, other defects may be sent for a predictive model that will use the defect prevention learning 310 database to predict what kind of actions lead to those defects. For example, the predictive model may determine what are the related application failure logs and what could have prevented the defect. The defect prevention learning 310 database sends such information to the original process 302 based on learning from the defect prevention learning. In one example, the true output may be the defect prevention learning, which is a framework created to assist and guide software application developers and/or testers in preventing future, similar defect issues.

Referring to FIG. 3, the application failure logs 304 capture one or more instances when the software application did not perform as intended, whether due to the technical glitches or any anomalies or unexpected behaviors. These failure logs provide insights about one or more weaknesses/vulnerabilities in the software application or system. For example, application failure logs may be for any technical failures or any failure. It may also include screenshots of the issues which the system may provide to the developer and/or tester, such as any error codes, HTTP error codes, information about any failures on the environment side, and the failure logs. Meanwhile, a defects database 306 may save information about historical data of previously identified and/or resolved defects that are used to uncover (e.g., identify) patterns and/or common pitfalls. Some examples of this saved information may include but is not limited to how these defects are categorized, how they are related, and/or the root cause of the defect.

In FIG. 3, PSO refers to particle swarm optimization. ABC refers to artificial bee colony, which is a stochastic search technique based on swarm intelligence, which mimics the process of honey bee swarms foraging for food. And, GA refers to genetical algorithm, and ACO refers to ant colony optimization.

In contrast to US published patent application US20200241861A1, titled, "Software component defect prediction using classification models that generate hierarchical component classifications," one or more disclosed embodiments of a swarm learning (SL) intelligence framework combine edge computing with a smart blockchain network comprising swarm edge nodes that exchange data that comprise of application failure logs, defects, and controls for learning. Such a framework may involve a structured problem-solving methodology that categorizes defects, performs automated analysis, and creates a learning dataset. And edge computing facilitates points of presence by filtering and/or caching data at the edge, which sometimes result in smaller amounts of data sent to the blockchain which provides secure permissioned access to the dataset.

In contrast to Published Chinese patent CN114968773A, titled, "Software defect prediction method based on gene expression programming algorithm," one or more disclosed embodiments of particle swarm optimization (PSO) based on SL intelligence may include a stochastic optimization technique based on the movement and intelligence of swarms designed with one or more metaheuristic algorithms. This may enable finding one or more optimal solutions in a high-dimensional solution space comprising, for example, application failure logs, defects, and controls from existing defect management.

Figure 4:
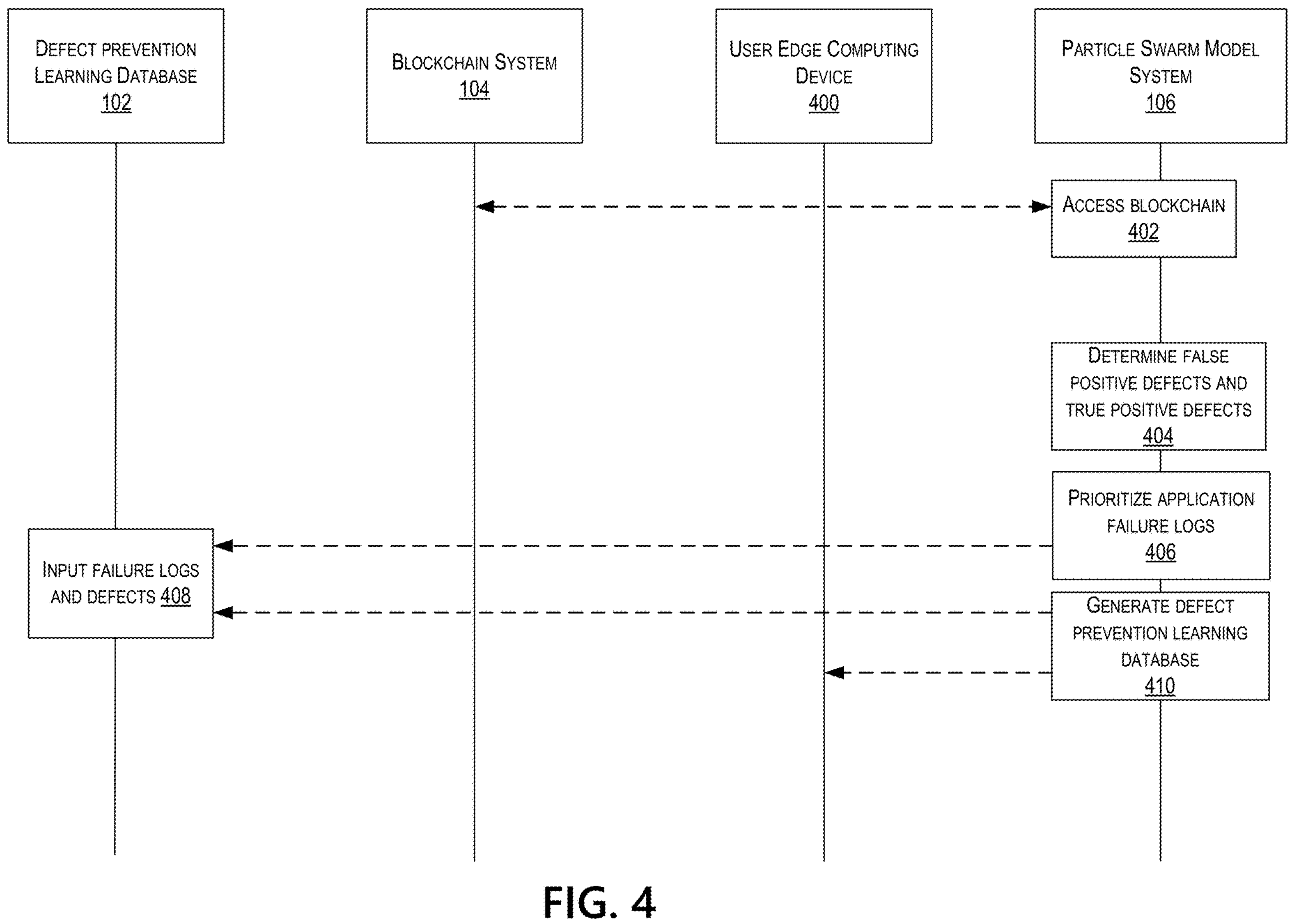
FIG. 4 depicts an interaction diagram of numerous components in a system in accordance with one or more aspects of the disclosure.

Regarding interaction diagram FIG. 4, a machine learning model in accordance with the disclosure herein may use natural language processing (NLP) to analyze the defect and stack traces to categorize the basis of bugs and issues, such as false positives or actual code issues. In one example, the machine learning model uses NLP and the data that is coming from swarm learning (SL) intelligence simultaneously or nearly simultaneously. The system may analyze the defect descriptors and stack the traces to categorize the issues. The categorization may happen based on the severity and/or the impact analysis of the defect—for example, as "what if" simulations of failure scenarios. And the predictive model may generate some output that goes to defect learning prevention.

Referring to FIG. 4, the swarm system 106 with QA agents may access 402 a blockchain system 104 to extract one or more software application failure logs. The log files may be large or may be distributed across multiple machines or systems. The system extracts a plurality of defects from the logs and determine 404 a plurality of software application failure logs that comprise false positive defects and true positive defects. When a true positive defect is determined, the system prioritizes 406 that plurality of software applications with the true positive defects for debugging. Meanwhile if the determined defect is not a true positive defect (e.g., because it is a false positive defect), then the system may input 408 the false positive defect to a defect prevention learning database 102 that includes a false positive defect database/data store. Finally, the insights gained in the defect preventions learning database 102 may be used at the user edge computing device 400 to provide insights to the user in mitigating the defects in the software application.

The term "boid" and agent are sometimes used interchangeably. The name boid corresponds to a shortened version of bird-oid, which refers to a bird-like object sometimes used in an artificial life program to simulate flocking of a swarm of agents or boids. In swarm learning (SL) intelligence, the agents/boids are typically not created, but rather, they are autonomous components designed and deployed as part of the system. Each boid is a distinct, self-contained unit programmed to follow rules and algorithms that govern its behavior. The design mimics that of biological systems, such as the behavior systems of ants, bees, birds, or fish, and it is programmed to the specific objectives of the SL intelligence. Through iterative cycles of interaction and/or adaptation, the SL intelligence may evolve to optimize the specific objective function, leading to a robust, scalable, and capable collective intelligence in a decentralized manner.

Figure 5:
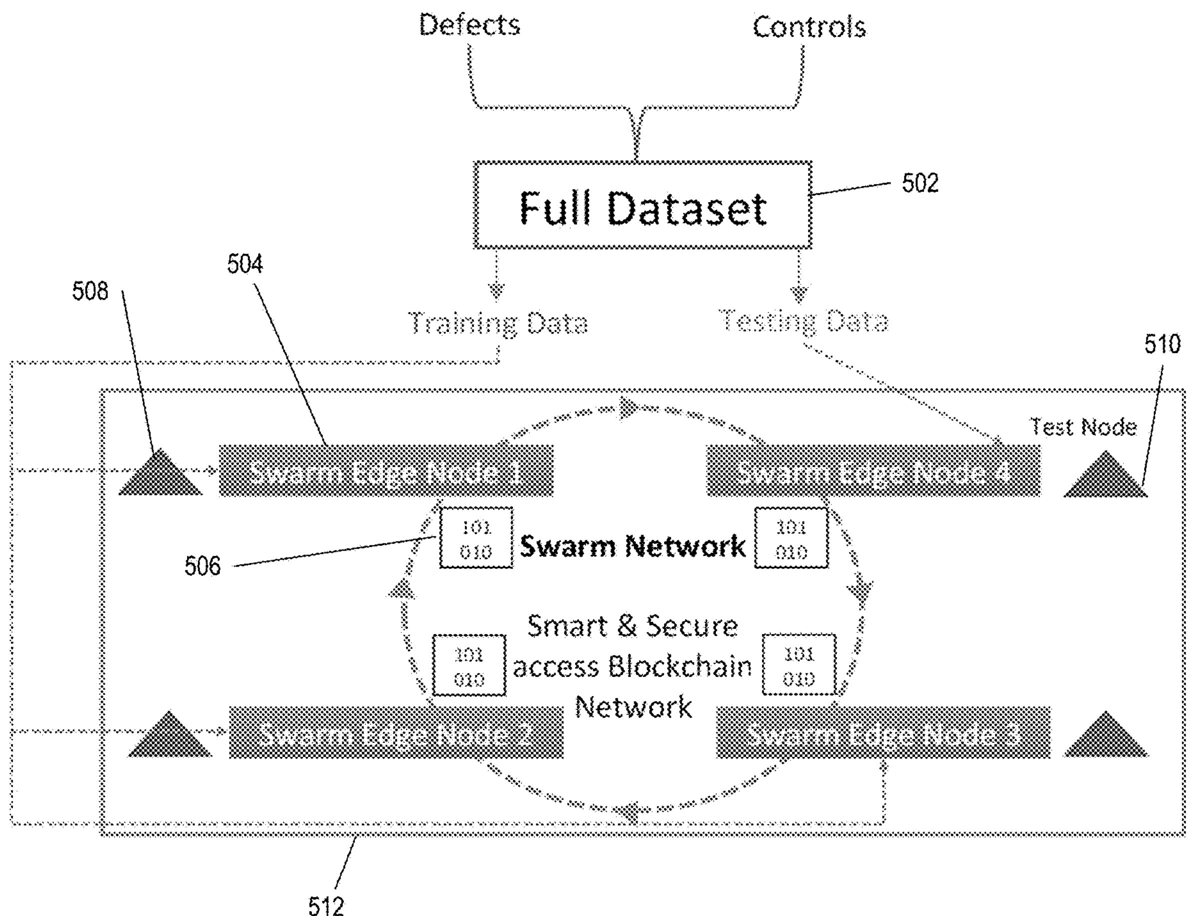
FIG. 5 depicts a swarm intelligence framework in accordance with one or more aspects of the disclosure.

Referring to FIG. 5, a description of various components depicted in a swarm intelligence framework follows:

QA agents—These are the core workers of the framework. They are software programs equipped with code scanning logic, machine learning models, natural language processing etc. to analyze code, logs, documentation to detect potential defects. Different types of specialized agents focus on different aspects like security flaws, performance bugs etc. The QA agents collaborate by sharing information about code defects as they are discovered. This helps build a collective knowledge base and prevents duplicate detection efforts. Agents can also self-organize into sub-groups focused on different modules/functions for optimized division of labor.

Self-organization—The agents follow simple code scanning rules and interactions with other agents. There is no centralized control dictating which part of the code each agent should analyze. The agents use cues like code complexity to self-select sections to scan for defects. This autonomous organization adapts to changing code landscapes.

Adaptability—The swarm adapts to changes in the environment. The QA swarm could adapt techniques and prioritize bugs according to new code or features. The agents can quickly adapt defect detection strategies, for example to focus on new features or code areas that see frequent changes. They identify new types of defects and can generalize patterns from analyzed code segments. This constant adaptation improves the testing efficiency.

P2P communication—Agents need to collaborate by sharing defect data they discover. A peer-to-peer communication network enables this by allowing agents to broadcast defects, coordinate scanning efforts, request info from other agents etc. This P2P architecture avoids central points of failure. Agents communicate with each other in a peer-to-peer manner to share defect insights, coordinate efforts.

Collective intelligence—The synergistic knowledge about code defects gives the agent swarm more comprehensive insights than individual testers could gather. It enables identifying diffuse defect patterns and making intelligent optimization decisions. The swarm as a whole achieves results greater than individual agents could. The collective knowledge about code defects enables smarter optimization.

Referring to FIG. 5, blockchain provides a decentralized ledger for transparent and tamper-proof record keeping of software defects. The following are additional descriptions of various components depicted in FIG. 5:

Blockchain ledger—The blockchain stores immutable records of all defect lifecycle events—detection, classification, assignment, resolution etc. Agents leverage blockchain transactions to log defects as they discover. Cryptographic hashes ensure record integrity.

Smart contracts—Programmatic contracts that encode defect resolution workflows and are auto-executed on the blockchain. These programs encode business logic for defect resolution workflows. They get auto-executed when conditions are met. For example, assigning high priority bugs to senior developers. Helps automate and enforce workflows.

Machine Learning—ML models continuously train agents to improve their defect detection capabilities and patterns identification by learning from historical data. Agents get better at understanding code structures, identifying defect patterns, classifying defect types etc. Models train on historical data as well as ongoing feedback from human experts.

Referring to FIG. 5, an integration occurs, in some examples, through a middleware layer that handles routing of information between the different components in a seamless way. For example, when an agent detects a defect, it may log it on a blockchain, inform peers, execute workflows through smart contracts, and also provide related data to train ML models. This improves synergies between components.

One or more advantages of edge nodes illustrated in FIG. 5 include but are not limited to the following:

Swarm intelligence involves distributed agents collaboratively analyzing software systems to identify and prevent potential defects.

Running all agents in the cloud would require high network bandwidth and compute costs for continuous monitoring and analysis of large codebases.

Edge computing allows pushing the swarm agents to edge devices like developer laptops, CI/CD servers, test machines located closer to the software systems. This localized processing reduces the data and traffic that needs to be transferred to the central cloud leading to significant bandwidth cost savings.

The decentralized nature of swarm intelligence makes it amenable to edge-based distributed execution without losing coordination and collaboration benefits.

- Edge resources can filter and preprocess data before transmitting analytics-ready datasets to minimize cloud processing costs.
- Latency is reduced by enabling real-time defect prevention right at code commit stage instead of waiting for cloud-based scanning.
- Edge deployments also enhance privacy and security of source code and system data by avoiding transfer of IP and customer data.
- Auto-scaling of agents is possible based on edge compute availability using technologies like Kubernetes without incurring cloud infrastructure costs.
- Updating models and rules for agents in a decentralized edge configuration is faster using technologies like federated learning compared to cloud deployments.

By leveraging edge computing strategically, the swarm intelligence framework for defect prevention may realize substantial cost optimization and efficiency gains. The synergies between edge and swarm intelligence open up intriguing possibilities for software quality and security.

FIG. 6 depicts a flowchart 600 of an illustrative swarm intelligence framework seeking an optimal solution. The swarm intelligence framework may use a number of particles (e.g., agents such as QA agents) that constitute a swarm moving around in the search space looking for the best solution. Each agent may adjust its traveling velocity dynamically, according to the experiences it has and other agents in the swarm. Each agent tries to keep track of: (1) its best result known as personal best or pbest. (local best fitness); and/or (2) the best value of any agent is the global best or gbest. (global best fitness). And each agent in the swarm modifies its position according to: (1) its current position; and/or (2) its current velocity, and the distance between its current position (current fitness) and pbest. (local best fitness).

Referring to FIG. 6, the modeling and/or simulations illustrate how the system is treating the swarm agents and the assignment of each node to responsibilities that they would categorize. They would determine the pattern and bases; thus, they can then categorize the defects for future processing and for recordation on the blockchain. Notably, because swarm agents collaborate amongst themselves in peer-to-peer communication, the information about a defect may be given to one agent, but the same information will automatically cascade across all agents in the swarm. Furthermore, in some examples, a particular node may assign a particular fitness value that will first be the global fitness value because that is the first QA agent to find the optimal solution. Therefore, the global fitness value would be the solution that that particular QA agent finds 602. Meanwhile, other QA agents may evaluate similar scenarios, and they find out the local fit best fitness for them. The other QA agents may further try to match it with the global fitness value determined by the aforementioned, particular QA agent. In other words, the evaluation mechanism determines if the global fitness value is equal to the current local fitness, then the system stops 604 the simulation, and the next set of defects will come through the mechanism again. The QA agent who is the main/primary agent will categorize the defect, and the other QA agents may evaluate their opinions against that right. They will match against the optimal solution found by the one agent against all other agents. And if that accurately matches, then the stopping criteria has been met and the next cycle/data set continues.

Figure 7:
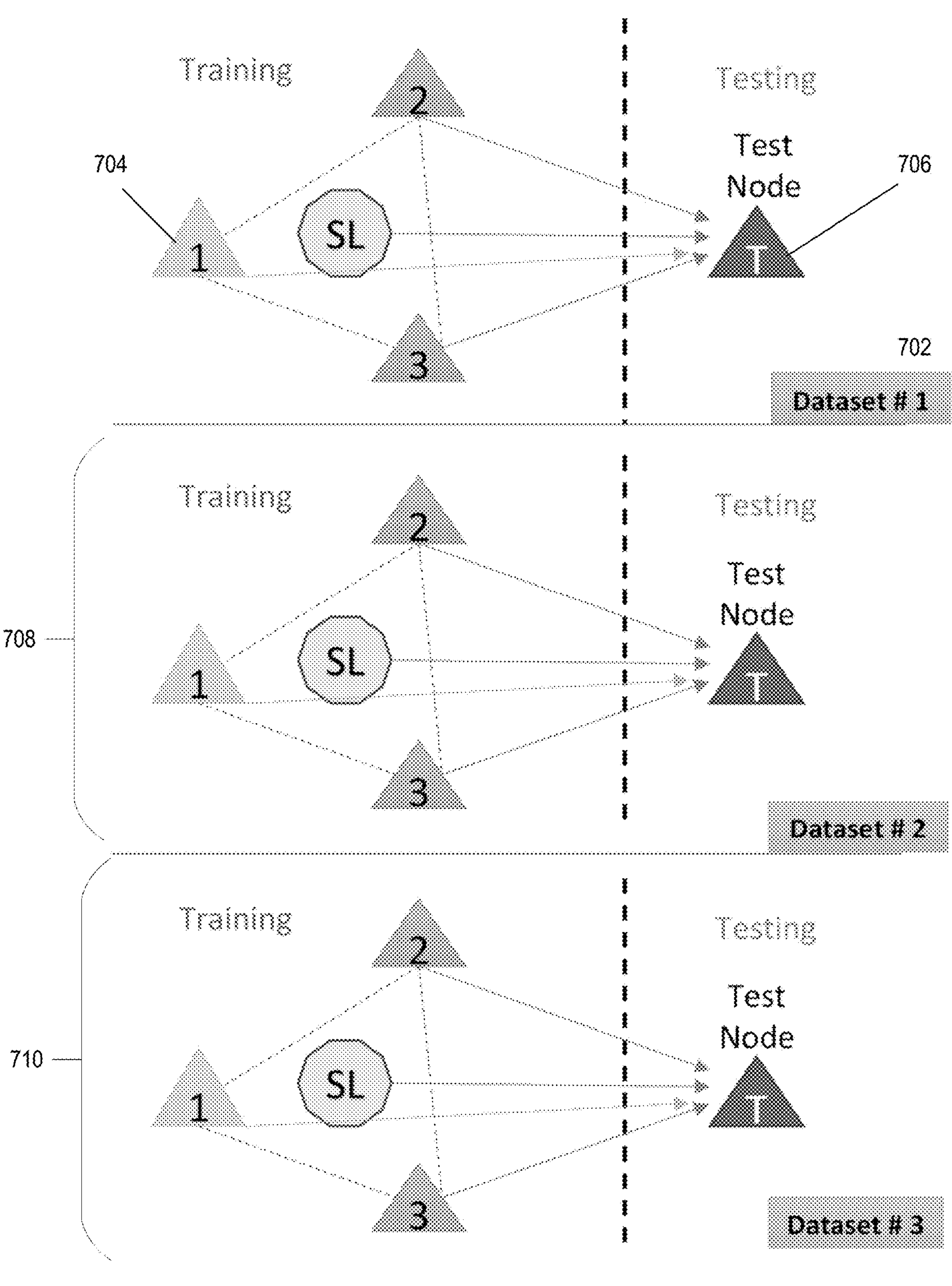
FIG. 7 depicts high-level overview of an experimental setup in accordance with one or more aspects of the disclosure.

Regarding FIG. 7, a high-level overview of an experimental setup may include at least one or more of the following steps. In one step, data consisting of application failure logs and overall defects may be split into non-overlapping training and test sets. In another step, training data may be siloed in swarm edge node 1 (reference 704), node 2, and node 3, and testing node T (reference 706) may be used as independent test set. Swarm learning (SL) may be achieved by integrating nodes 1-3 for training. The nodes that form the swarm intelligence framework handle fixing and/or mitigating of software defects, thus are simulating agents equipped with software code programmed with logic, machine learning, and/or natural language processing. The agents may, in some embodiments, analyze the codes, or analyze the logs and/or documentation (e.g., documentation in a defects database). The agents may use the information and suggest alteration to configuration, environmental, and/or other settings in the system. The agents may divide tasks among themselves, and/or collaborate by sharing information with each other. As a result, they may build a collective knowledge base and/or prevent duplicate detection efforts. For example, once an agent identifies the information and shares it with the rest of the agents, duplication of that effort is avoided. Thus, since the information is shared among each other, these agents are capable of self organizing themselves into subgroups. And they may focus on different modules or function so that they optimize the overall framework.

In one example, agents may follow simple code scanning rules and interact with each other. There is no centralized control (e.g., centralized server) dictating which agent do what—the agents self-understand themselves by collaborating, so they divide the work to optimize between two or more agents. Such a framework is a collective intelligence—the knowledge they gain about the defects, their patterns, their criticality, and their priorities, affords the agent in the swarm comprehensive insights; it enables identifying defect patterns and making intelligent optimizing decisions. The swarm as a whole achieve a greater result than an individual agent might, thus enabling a smarter optimization because they work in collaboration.

Referring to FIG. 7, yet another step may include using evenly distributed samples, but siloing samples from previous defect disposition to dedicated training nodes and varying case/control ratios between nodes. In another step, statistical differences between results derived by SL and all individual nodes including all permutations performed are calculated as depicted in the illustrative flowchart of FIG. 6 to reach one or more optimal solutions.

Regarding the middleware layer described with respect to FIG. 5, in FIG. 7 the swarm learning intelligence 700 may communication with swarm agents 704 using different data sets 702, which may comprise application failure logs and overall defects, that are split into training data and test data. The swarm learning (SL) intelligence may create a predictive model that deciphers traces, and finds out and analyzes defect descriptors. In some examples, the system 700 may compare against different data sets and the statistical differences between the results derived by all the agents 708, 710 including a plethora of permutations that may be performed, thus reaching an optimal solution.

The system 700 may be used not just for software defect management, but also for defect prevention of future instances of the defects. The system 700 may generate an autonomous report to the application developer and/or other users from the learnings to suggest different software code that would avoid such defect scenarios in the future.

Regarding the swarm learning (SL) intelligence in FIG. 7, in some examples, the system may use edge nodes, not just regular nodes, thus enabling edge computing instead of running the swarm of agents in a cloud infrastructure.

Operating completely in a cloud infrastructure would require high network bandwidth and the compute cost for continuous monitoring would also increase. The system 700 is designed to leverage edge computing of the swarm agents, thus delegating the swarm agents to edge devices, such as a developer's laptop or test machines that are located closer in proximity to the software system. As a result of this localized processing, it reduces the data and the traffic that needs to be transferred to a central cloud, thus leading to substantial bandwidth and/or cost saving. And this decentralized nature of swarm intelligence makes it amenable to edge based distributed execution without losing the coordination and collaboration efforts. Consequently, if one node goes offline, with the use of edge computing, auto-scaling of the swarm of agents is possible because edge compute availability is possible without incurring cloud infrastructure cost. And a single point of failure is avoided.

Figure 8:
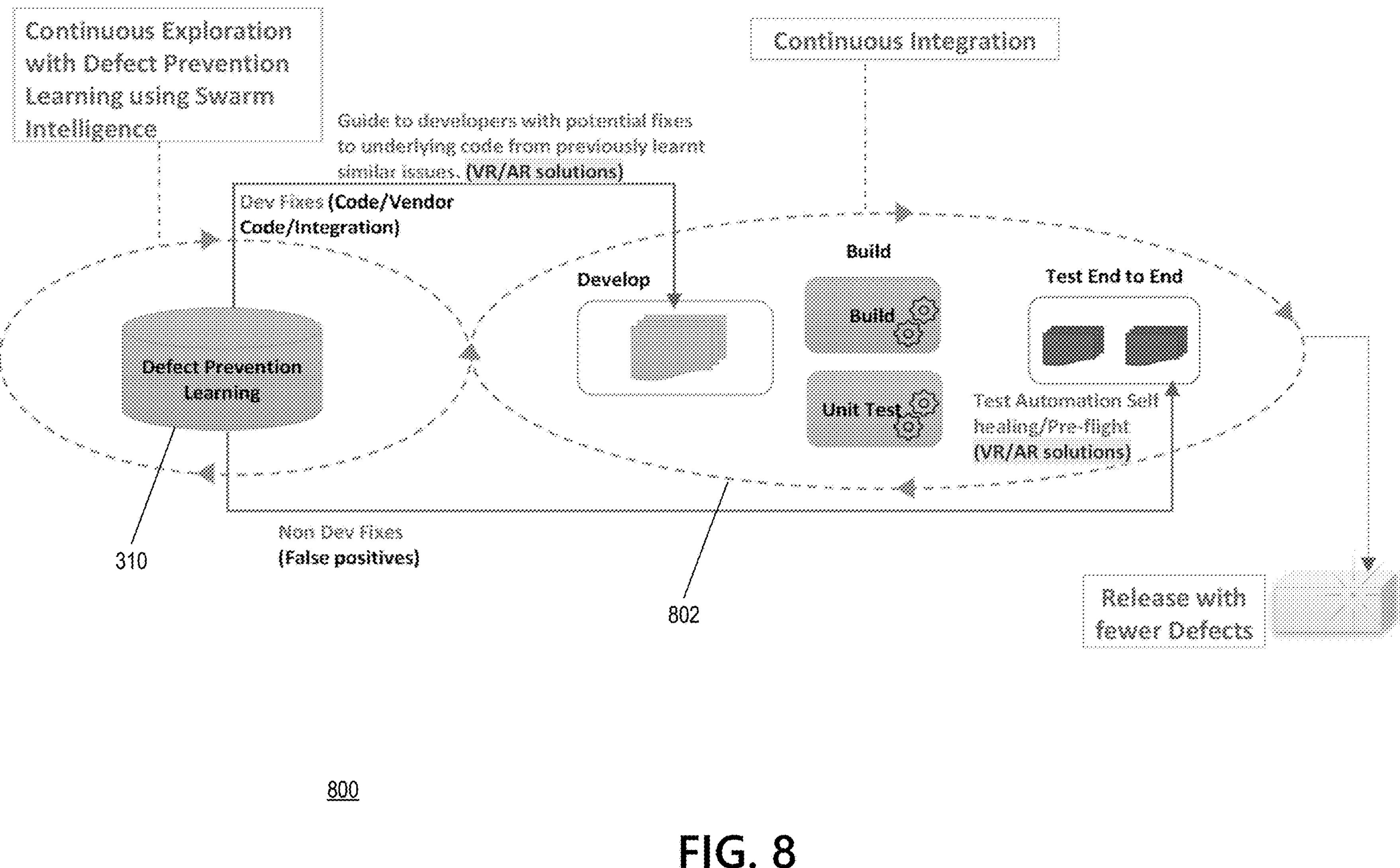
FIG. 8 depicts an illustrative computing environment with virtual reality and augmented reality experimental simulations in accordance with one or more aspects of the disclosure.

Regarding FIG. 8, the illustrative system 802 shows virtual reality and augmented reality (VR/AR) experimental simulations developed to analyze cognitive responses to specific defect categories. These solutions/remedies may then be converted into remote assistance programs for users, such as for VR/AR preventive maintenance against baseline conditions and/or VR/AR corrective maintenance based on blockchain-created solution datasets. In one example, an expert solution may be converted into remote assistance programs for developer users and/or quality assurance test users, and integrated into CI/CD servers to automatically fix one or more common issues themselves. As a result of the system in FIG. 8, the outputted software application is released with fewer defects than if the system 802 had not been used, inter alia, in combination with a defect prevention learning dataset 310.

In one example, to build intuitive software defect management simulations, a unity engine framework may be used to, inter alia, provide rendering, physics, and optimizations desired to build high-fidelity three-dimensional (3D) simulations. The unity framework may provide an agile base to iteratively create intelligent, data-driven defect simulations with engaging user interactions in both virtual reality (VR) and/or augmented reality (AR) modes. Community support may also facilitate rapid prototyping. At least some aspects of the illustrative embodiment may include: (1) categorizing common defect types based on root causes—such as logic errors, incorrect calculations, boundary condition violations, and so on; (2) for each category, developing immersive VR environments representing real-world software scenarios where that defect category could occur. E.g., for logic errors, create a VR e-commerce website checkout flow simulation; (3) introducing defects in the VR simulation corresponding to each category—e.g., incorrect cart total calculation; (4) developing AR overlays on top of the VR environments to provide contextual cues and guidance; these could highlight potential defect hotspots, provide debugging info, and so on; (5) creating developer and tester personas and mapping their roles to VR/AR interactions; developers may, in some embodiments, access code in VR and make fixes with AR assistance; meanwhile, testers may validate flows and identify defects; and (6) correlating the captured metrics data with actual defect resolution performance on those categories to derive insights; expand the simulation canvas to cover more categories to make it a holistic defect analysis and resolution environment. By providing controllable VR defect scenarios combined with AR aids, optimal modalities for defect diagnosis and resolution based on cognitive response data may be analyzed. These simulations enable new developers on the team to decipher automated processes through the existing framework. The development team may work on the simulations instead of working on actual codebase, thus helping to reduce errors in the actual code commits and eventually reducing the defects.

For example, during development and testing phases, developers and quality assurance team members may access the immersive VR/AR tools and this integration would enable them to expedite the identification and resolution of common software issues which will occur. This relationship between technology and software development accelerates the debugging process and elevates overall software quality. Moreover, capitalizing on the knowledge of these professionals, who assist in debugging, the system transforms their insights into interactive models within VR/AR environments. The developers and QA personnel may utilize these models to access guidance and solutions for intricate challenges. And the immersive nature of VR/AR technology empowers individuals to comprehend issues, identify root causes, and effectively implement. Another aspect of the disclosed framework is the promotion of enhanced collaboration and continuous learning among software development teams. The system offers a shared platform for collaborative problem solving and convergence of expertise from diverse stakeholders. Additionally, the immersive VR/AR simulation hardware/tools foster an environment conductive to knowledge transfer and on the job training. This synergy nurtures a culture of perpetual learning and improvement, enabling our software development teams to tackle challenges creatively.

Regarding FIG. 8, the system may incorporate advanced, virtual and augmented reality simulations to comprehensively analyze the cognitive responses to distinct categories of software defects. Thus, by immersing participants/users in intricately designed virtual scenarios, the system captures and analyzes it. These simulations provide insights into human behavior when encountering software issues, enabling software developers to enhance their approaches and strategies for addressing defects. Drawing upon the expertise of domain specialist, the system offers a program with step by step guidance and support empowering users to independently navigate through troubleshooting and issue resolution. The system introduces a proactive dimension to software maintenance through the implementation of predictive algorithms. Therefore, by analyzing the historical data, these algorithms may identify patterns leading to the emergence of defects. The VR or AR interface (e.g., VR simulation headset) notifies users about potential issues and provide detailed guidance to preempt/prevent issues. The incorporation of blockchain technology, ensures the creation of a transparent and a tamper proof data set which documents the effectiveness of preventive measures and outcomes. This system establishes a resilient cataloging that is passed into instances of defect categories and their corresponding solution outcomes.

In one example involving the continuous integration CNCD model with the VR/AR framework, the system has already categorized defect types based on their root causes. Next the system creates an environment which represent real world software scenarios where typically a defect category would occur. For example, to simulate a logical error, the system may create a simulation e-commerce site to check to for website checkout flow in a common scenario where logic errors may happen. The system may then introduce defects into the VR/AR simulations corresponding to each category. Thus, in an e-commerce site example, it may be an incorrect check-out cart total calculation. Moreover, the simulated environment may provide contextual cues and guidance, thus highlighting potential defect hotspot and debugging information for the developer. For example, it is tedious for one person from the team to be assigned to teach everyone everything. Thus, a VR/AR solution assists with onboarding new users, while also teaching them coding practices the organization follows; further leveraging the defect prevention model disclosed herein. Additionally, the system may create simulations bespoke to a new person being onboarded.

Furthermore, regarding VR/AR frameworks, from the defect prevention learning data store, the system knows which defects are actual code defects that the developer should be requested to prioritize. In some examples, the system may use a large language model, such as with GPT techniques, to encode and decode to create VR/AR simulations. In some examples, transformer-based sequence to sequence models may be used. For the encoder and the decoder, the large language model may use a similar kind or type of model to create simulations and develop simulations into a VR and/or AR output. In other words, feedback from the defect prevention learning database may be used as an input to one or more machine learning models that generate an output which is used in the VR/AR simulation.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air and/or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A swarm learning (SL) computing system that categorizes application defects using a plurality of nodes communicatively coupled by a peer-to-peer communications network, the SL computing system comprising:

a swarm of boids comprising at least a first quality assurance (QA) agent and a second QA agent, wherein the swarm of boids correspond to the plurality of nodes;

a blockchain comprising a plurality of blocks corresponding to a plurality of software application failure logs and defects data, wherein the plurality of software application failure logs indicates events associated with a plurality of software applications that failed, and wherein the defects data corresponds to what caused the plurality of software applications to fail;

a particle swarm optimization (PSO) model configured to categorize the defects data as either a false positive defect or a true positive defect, wherein the PSO model comprises a field based, gene expression programming algorithm, and wherein the gene expression programming algorithm adjusts a crossover rate, a mutation rate, or a population size based upon the field variation improving a defect prediction accuracy;

wherein the PSO model is configured to test the plurality of software applications, wherein the PSO model is configured to receive training data to cause generation of the swarm of boids, wherein the swarm of boids correspond to the plurality of application failure logs and the defects data, wherein the swarm of boids are configured to calculate a first grouping of software application failure logs that comprise false positive defects and a second grouping of software application failure logs that comprise true positive defects, wherein parameters of the PSO model are adjusted by one or more metaheuristic algorithms, wherein a defect prevention framework is generated by the PSO, and wherein the defect prevention network provides a guide to a software developer with a solution or a fix to true positive defects; and an edge node of the plurality of nodes, wherein the edge node comprises a personal computing device corresponding to the software developer, wherein based on the true positive defects that are prioritized depending on a severity of the true positive defects, the edge node is configured to receive a feedback loop from the PSO model.

2. The SL computing system of claim 1, wherein the feedback loop from the PSO model to the edge node is configured to prevent a future defect.

3. The SL computing system of claim 1, wherein the training data comprises data at least extracted from the blockchain, and wherein the blockchain comprises a distributed ledger system.

4. The SL computing system of claim 1, wherein the metaheuristic algorithms enhance accuracy and relevance of data-driven insights.

5. The SL computing system of claim 1, wherein the PSO model further comprises an ant colony optimization (ACO).

6. The SL computing system of claim 1, wherein the receiving into the PSO model occurs asynchronously and non-sequentially for the plurality of software application logs and the defects data.

7. The SL computing system of claim 1, wherein the blockchain stores immutable records of at least defect lifecycle events comprising: detection, classification, assignment, and resolution.

8. The SL computing system of claim 1, wherein the swarm of boids uses pattern identification by learning from historical data from the blockchain.

9. The SL computing system of claim 1, wherein the first QA agent is configured to autonomously adhere to code scanning rules and interactions with other agents in the swarm of boids without a centralized server dictating which parts of the plurality of software applications to analyze by each QA agent.

10. The SL computing system of claim 1, wherein the feedback loop from the PSO model comprises embeddings for use with one or more machine learning models.

11. The SL computing system of claim 1, wherein the swarm of boids are configured to self-organize into groups for optimal division of labor and adaptation.

12. A method for categorizing application defects using a plurality of nodes communicatively coupled by a peer-to-peer communications network, wherein the plurality of nodes corresponds to a swarm of boids, the method comprising:

(a) accessing a blockchain, which comprises a plurality of blocks corresponding to a plurality of software application failure logs indicating events associated with software application failures and defects data that caused the software application failures, to extract, as training data, the one or more application failure logs and the defects data from the plurality of blocks;

(b) categorizing, by a particle swarm optimization (PSO) model, the defects data as either a false positive defect or a true positive defect, wherein the PSO model comprises a field based, gene expression programming algorithm, and wherein the gene expression programming algorithm adjusts a crossover rate, a mutation rate, or a population size based upon the field variation improving a defect prediction accuracy;

(c) testing, by the PSO model, the plurality of software applications;

(d) receiving training data to cause generation of the swarm of boids, wherein the swarm of boids correspond to the plurality of application failure logs and the defects data, (e) calculating a first grouping of software application failure logs that comprise false positive defects and a second grouping of software application failure logs that comprise true positive defects;

(f) generating a defect prevention framework, wherein the defect prevention network provides a guide to a software developer with a solution or a fix to true positive defects;

(g) adjusting, by one or more metaheuristic algorithms, one or more parameters of the PSO model; and (h) receiving, by an edge node of the plurality of nodes, a feedback loop from the PSO model.

13. The method of claim 12, wherein the feedback loop from the PSO model to the edge node prevents a future defect in the plurality of software applications.

14. The method of claim 12, wherein the PSO model further comprises an ant colony optimization (ACO).

15. The method of claim 12, wherein the swarm of boids are configured to self-organize into groups for optimal division of labor and adaptation.

16. A non-transitory computer-readable medium storing instruction that, when executed by one or more computer processors, cause the one or more computer processors to perform a method comprising steps of:

(a) accessing a blockchain, which comprises a plurality of blocks corresponding to a plurality of software application failure logs indicating events associated with software application failures and defects data that caused the software application failures, to extract, as training data, the one or more application failure logs and the defects data from the plurality of blocks;

(b) categorizing, by a particle swarm optimization (PSO) model, the defects data as either a false positive defect or a true positive defect, wherein the PSO model comprises a field based, gene expression programming algorithm, and wherein the gene expression programming algorithm adjusts a crossover rate, a mutation rate, or a population size based upon the field variation improving a defect prediction accuracy;

(c) testing, by the PSO model, the plurality of software applications;

(d) receiving training data to cause generation of a swarm of boids, wherein the swarm of boids correspond to the plurality of application failure logs and the defects data;

(e) calculating a first grouping of software application failure logs that comprise false positive defects and a second grouping of software application failure logs that comprise true positive defects;

(f) generating a defect prevention framework, wherein the defect prevention network provides a guide to a software developer with a solution or a fix to true positive defects;

(g) adjusting, by one or more metaheuristic algorithms, one or more parameters of the PSO model; and (h) receiving, by an edge node of the swarm of boids, a feedback loop from the PSO model.

17. The non-transitory computer-readable medium of claim 16, wherein the feedback loop from the PSO model comprises embeddings for use with one or more machine learning models.

* * * * *